June 4, 1940.  C. S. DRAPER  2,202,900
INDICATING APPARATUS
Original Filed Jan. 2, 1934  2 Sheets-Sheet 1
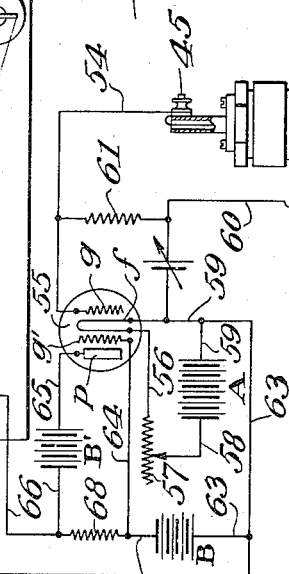
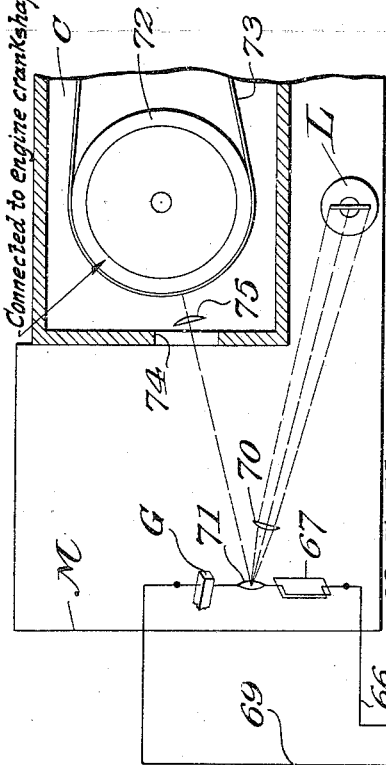
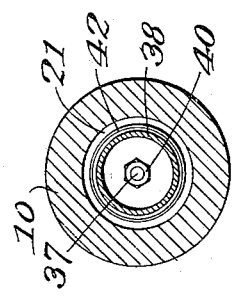
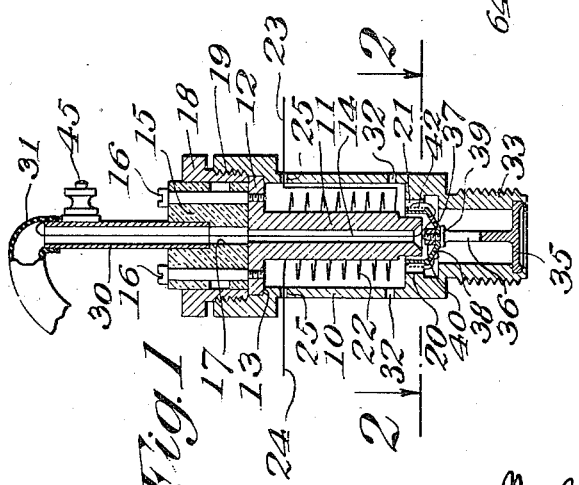
Inventor:
Charles S. Draper
By Macleod, Calver, Copeland + Dike
Attorneys.

June 4, 1940.					C. S. DRAPER					2,202,900
INDICATING APPARATUS
Original Filed Jan. 2, 1934        2 Sheets-Sheet 2
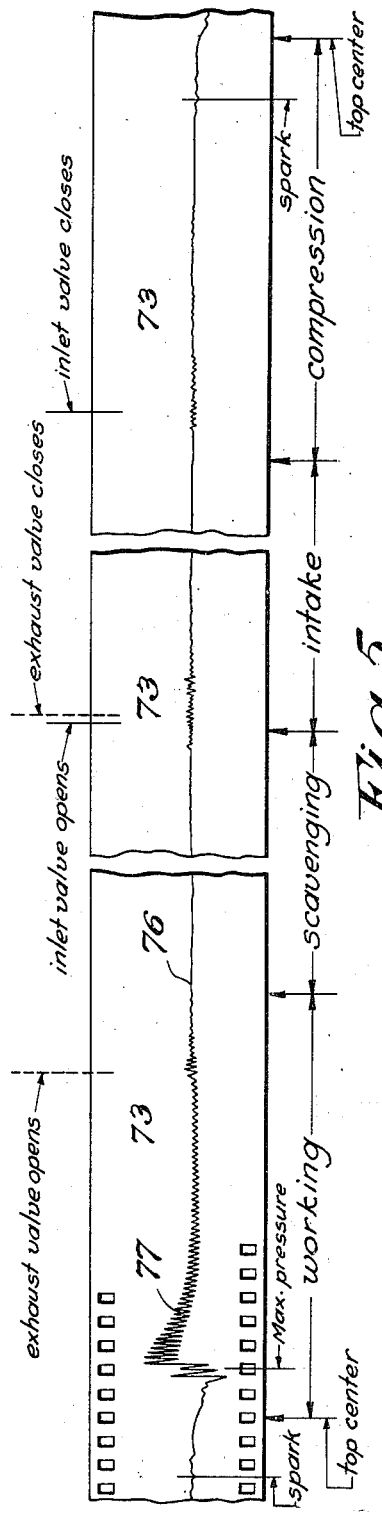
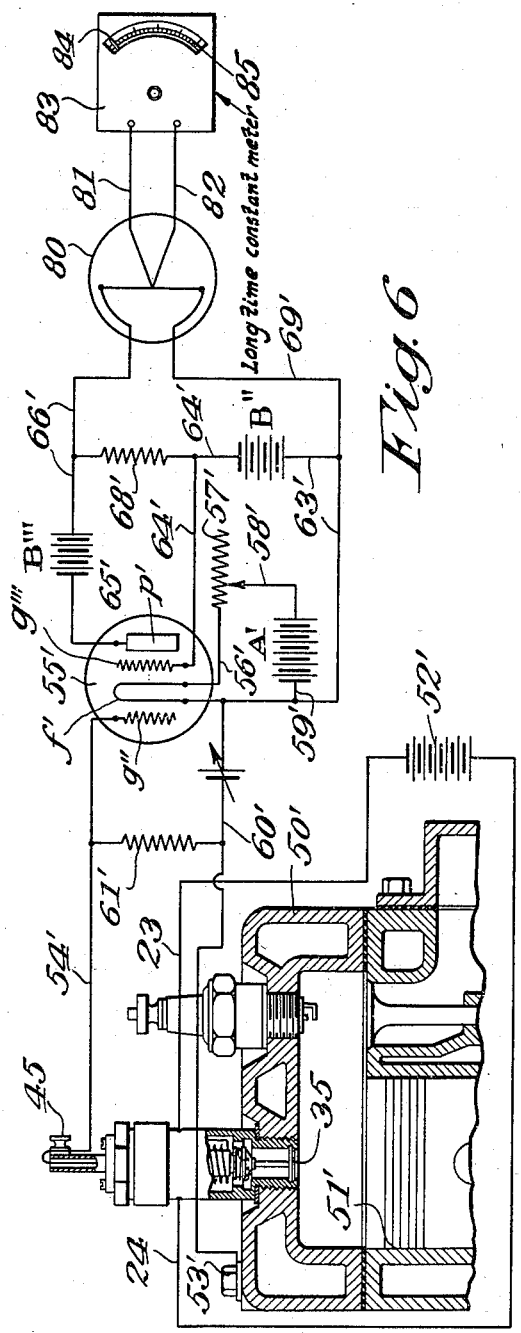
Inventor:
Charles S. Draper
By McLeod, Calver, Copeland & Dike
Attorneys Patented June 4, 1940

2,202,900

UNITED STATES PATENT OFFICE 2,202,900

INDICATING APPARATUS

Charles S. Draper, Palo Alto, Calif., assignor to Research Corporation, New York, N. Y., a corporation of New York Application January 2, 1934, Serial No. 704,868
Renewed June 8, 1937

4 Claims. (Cl. 177—351)

This invention relates to devices for obtaining data concerning the operation of various types of engines, pumps or other apparatus having one or more chambers enclosing fluids under substantial pressures and more particularly internal combustion engines.

Certain data concerning the operation of internal combustion engines has been obtained by devices which give a direct indication of the pressure within the cylinder of an engine. These devices were of complicated and delicate construction and were inaccurate for various reasons. One of the most recently developed instruments for this purpose is the electric type in which a Wheatstone bridge circuit is employed, two of the arms of which are constituted by stacks of carbon discs. These carbon disc piles are mounted on opposite sides of an arm which is under the influence of the gaseous pressure on a diaphragm. When the gas pressure varies, the pressure on one stack of carbon discs increases while that on the other stack decreases; this throws the Wheatstone bridge out of balance and causes a current to flow through the battery circuit which is directly proportional to the gas pressure within the cylinder. The accuracy of this instrument was affected by heat in the cylinder of an engine causing deflection of the diaphragm with the resulting pressure upon one of the stacks of carbon discs. Calibration for these thermal deflections was necessary and uncertain.

The present invention contemplates the provision of a device for giving indications of the rate of change of pressure in a cylinder of an internal combustion engine which furnishes the engineer with important data concerning the operation of the engine some of which were not furnished by the devices giving a direct indication of the pressure. The device of the invention is of simple and rugged construction and its accuracy is not affected by those thermal deflections which made calibration of the above mentioned electric instrument necessary and uncertain.

In its broad aspect, the invention contemplates the provision of a device for inducing a voltage upon a conductor or electrical coil in response to changes in pressure within a cylinder of an internal combustion engine and then obtaining a measure of the induced voltage by the use of an indicating instrument selected in accordance with the data desired concerning the operation of the engine. The device is constructed to provide a substantially constant magnetic field in which is positioned a coil adapted to receive an induced voltage. A diaphragm or equivalent element is arranged to be subjected to and oscillated in response to changes in pressure within the engine cylinder. This diaphragm is associated with a member movable therewith and positioned in the magnetic field. Consequently, the movement of the diaphragm effects changes in the flow of magnetic flux relative to the coil causing a voltage to be induced upon the latter. The output voltage of the coil may operate the indicating or recording instrument directly or through a proper vacuum tube amplifier.

The invention will be more clearly understood from the following description in conjunction with the accompanying drawings, in which:

Fig. 1 is a sectional elevational view of a device embodying the invention;

Fig. 2 is a sectional view taken upon the line 2—2 of Fig. 1;

Fig. 3 is a detail view, partly in section, of a portion of the device;

Fig. 4 is a diagrammatic view showing the device assembled upon an internal combustion engine and hooked up to an indicating or recording instrument for giving a record of the rate of change of pressure within the engine cylinder;

Fig. 5 is a plan view of a photographic film upon which a record has been taken in the apparatus illustrated in Fig. 4; and Fig. 6 is a diagrammatic view showing the device assembled upon an internal combustion engine and hooked up with an instrument or meter having a long time constant.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The embodiment of the invention illustrated in the accompanying drawings, referring particularly to Figs. 1 to 3 inclusive, comprises a ferrous metal casing 10 of general hollow cylindrical form. A cylindrical core 11 of iron is positioned within the casing and is provided at its upper end with an annular flange 12 adapted to rest upon a shoulder 13 formed upon the interior wall of the casing. The core 11 is provided with a small longitudinal passage 14. A block of insulating material 15 is suitably held upon the outer end of the core 11 by screws 16 passing through the same and engaging the annular flange 12. The block 15 is provided with a longitudinal passage 17 registering with the longitudinal passage 14 in the core 11. The core 11 is held in position within the casing by a member 18 surrounding the block 15 and engaging an internal threaded portion 19 near the upper end of the casing. An annular projection 20 is formed upon the interior wall of the casing adjacent the lower end of the core 11 so as to provide an air gap 21 between the core and projection. An exciting coil 22 surrounds the core 11 and is supplied with electrical energy through leads 23 and 24 passing through openings 25 in the casing to a suitable source of electrical supply. A tube 30 of copper or other electrical conductor is fixed in the passage 17 of the block 15 so as to project therefrom. If desired, an air supply tube 31 may be fixed upon the outer end of the tube 30 so as to supply cooling air to the interior of the device, the air being exhausted through passages 32 formed in the casing 10.

The other end of the casing 10 is provided with a threaded portion 33 adapted to be received in a threaded opening in the cylinder head of an internal combustion engine. The edge of a metallic diaphragm 35 is embedded in the casing near the end of the threaded portion 33 to form a gas tight seal therebetween and is provided with a pillar 36 projecting therefrom into the casing. The inner end of the pillar 36 is provided with a threaded portion 37. A cup-shaped member 38 is held upon the pillar 36 between a shoulder 39 thereon and a nut 40 engaging the threaded portion 37. The member 38, in the embodiment illustrated, is constructed of a light non-ferrous metal, such as magnesium, and carries coil 42 of copper wire, a coating of a suitable insulating material being applied to the member 38 between the same and the coil 42. The length of the air gap 21 is so adjusted in relation to the length of the coil 42 that the coil will be in a region of uniform flux density throughout any possible diaphragm deflection. One end of the coil 42 is electrically connected with the member 38. The other end of the coil 42 is extended through one of the openings 44 in the member 38 and thence through the passages 14 and 17 and the tube 30 is connected with a binding post 45 upon the tube 30.

Fig. 4 shows the device of the invention operatively positioned in the cylinder head 50 of an internal combustion engine with the threaded portion 33 engaging a threaded opening in the head 50 so that the diaphragm 35 is directly exposed to the gas pressure within a cylinder 51. As shown, the leads 23 and 24 from the exciting coil 22 are connected to the opposite terminals of a battery 52. The end of the coil 42 which is connected to the member 38 is electrically connected through the pillar 36 and the diaphragm 35 as well as the cylinder head 50 with a binding post 53 upon the latter. The other end of the coil 42 is connected through the binding post 45 and the lead 54 with a grid $g$ of an amplifying tube 55. The filament $f$ of the tube 55 is connected through the lead 56 with one terminal of a rheostat 57, the other terminal of which is connected by a lead 58 with one terminal of a battery A. The other terminal of the battery A is connected with the filament by a lead 59. The binding post 53 is connected with the lead 59 by a lead 60. A resistance 61 is imposed across the leads 54 and 60. One terminal of a battery B is connected with the lead 59 by a lead 63. The other terminal of the battery B is connected with a grid $g'$ of the tube 55 by a lead 64. The plate $p$ of the tube 55 is connected by a lead 65 with one terminal of a battery B'. The other terminal of the battery B' is connected by a lead 66 with one terminal of the coil 67 of a galvanometer G which is carried within an L-shaped mounting M of an oscillograph from which natural light is excluded. A resistance 68 is imposed across the leads 64 and 66. The lead 63 is connected by a lead 69 with the other terminal of the coil 67 of the galvanometer G.

The mounting M has a camera C suitably secured thereto. A drum 72 is mounted within the camera and is rotated by mechanism (not shown) in synchronism with the crank shaft of the internal combustion engine. A photographic film 73 is led from a suitable supply roll over the drum 72 and is driven by the latter in synchronism with the crank shaft of the internal combustion engine. The light rays from a suitable source of light, such as a lamp L, are concentrated by a lens 70 upon the rotatable mirror 71 of the galvanometer G. The light rays are reflected from the mirror 71 through an opening 74 in the camera wall and are concentrated by a lens 75 upon the photographic film 73.

It will be apparent that the oscillation of the diaphragm 35 in response to changes in pressure within the cylinder 51 will produce oscillation of the member 38 and coil 42 in the air gap 21. The coil 22 creates a flow of magnetic flux in a circuit through the wrought iron core 11, the casing 10 and thence across the air gap 21. By proper selection of mass and elastic constants for the diaphragm 35, pillar 36 and member 38 as well as the coil 42, the velocity of the coil 42 may be made to depend directly upon the rate of change of gas pressure within the cylinder 51. The oscillation of the coil 42 in the magnetic field between the poles of the electromagnet causes a voltage to be induced in the coil. This induced voltage is amplified by the amplifying tube 55 and impressed upon the coil 67 of the galvanometer G to cause oscillation of the mirror 71 which in turn reflects the light rays from the lamp L upon the photographic film 73 to produce a record of the change of pressure as shown by the curve 76 upon the film 73 in Fig. 5. It will be noted that the curve 76 not only gives a record of the maximum rate of change of pressure but also gives an indication of the changes in pressure due to detonation as shown by the waves 77.

The device of the invention supplying an indication of the rate of change of pressure, as explained, gives valuable information concerning the operation of an internal combustion engine. Thus, it indicates the maximum rate of pressure rise which not only is dependent upon certain characteristics of the engine but also upon the character of the fuel employed and should be restricted to a certain range for satisfactory engine operation. The rate of change of pressure indication also enables the engineer to determine the crank angle at which maximum pressure occurs and this should take place within a narrow range for best engine output. It gives an indication of the presence or absence of pressure waves within the cylinder, that is, whether or not detonation exists. It also gives an indication of the intensity of detonation if it exists.

The construction of the device of the invention is rugged and simple and requires no close fits or uncertain calibration for zero pressure. In the embodiment specifically illustrated, the output voltage of the coil 42 is always directly proportional to the coil velocity, that is, the characteristic is linear.

Fig. 6 illustrates the device of the invention hooked up with a meter having a long time constant and is particularly valuable as a detonation meter. The device of the invention is operatively positioned in the cylinder head 50' of an internal combustion engine so that the diaphragm 35 is directly exposed to the gas pressure within a cylinder 51'. As shown, the leads 23 and 24 from the exciting coil 22 are connected to the opposite terminals of a battery 52'. The end of the coil 42 which is connected to the member 38 is electrically connected through the pillar 36 and the diaphragm 35 as well as the cylinder head 50' with a binding post 53' upon the latter. The other end of the coil 42 is connected through the binding post 45 and the lead 54' with a grid g'' of an amplifying tube 55'. The filament f' of the tube 55' is connected through the lead 56' with one terminal of a rheostat 57', the other terminal of which is connected by a lead 58' with one terminal of a battery A'. The other terminal of the battery A' is connected with the filament by a lead 59'. The binding post 53' is connected with the lead 59' by a lead 60'. A resistance 61' is connected across the leads 54' and 60'. One terminal of a battery B'' is connected with the lead 59' by a lead 63'. The other terminal of the battery B'' is connected with a grid g''' of the tube 55' by a lead 64'. The plate p' of the tube 55' is connected by a lead 65' with one terminal of a battery B'''. The other terminal of the battery B''' is connected by a lead 66' with one end of the heating wire of a vacuum thermo-couple 80. A resistance 68' is imposed across the leads 64' and 66'. The lead 63' is connected by a lead 69' with the other end of the heating wire of the vacuum thermo-couple 80. This thermo-couple 80 is connected by the leads 81 and 82 to the terminals of a direct current meter 83 having a long time constant. The meter 83 is provided with the usual indicating pointed 84 adapted to move over a suitable scale 85 graduated in terms of suitable units representative of the extent of detonation taking place in the cylinder of the engine.

The voltage induced in the coil 42 will be amplified by the amplifying tube 55' and the amplified voltage will be impressed upon the heating wire of the thermo-couple 80 to produce heating depending upon the rate of change of pressure within the cylinder. This heating creates a direct current which is indicated upon the meter 83. Due to the long time constant of the meter 83 the current indicated thereby in response to the rate of change in pressure in the engine cylinder where no detonation takes place will be small compared to the current indicated in response to the rate of change of pressure in the cylinder where detonation takes place. Consequently, when no detonation takes place in the engine the indication upon the meter 83 will be small, whereas, when detonation takes place the indication will be large. The indication of the meter 83 gives a measure of the average or root mean square value of the voltage induced in the coil 42 in response to the changes in pressure within the cylinder of the engine and, consequently, the indication is peculiarly valuable as a measure of detonation intensity.

Throughout the appended claims the expression "pressure within the cylinder of an internal combustion engine" is intended to include other types of engines, pumps or other apparatus having chambers enclosing fluids under substantial pressures.

I claim:

1. An apparatus for obtaining a representation of rate of change in pressure within the cylinder of an internal combustion engine comprising means for producing a magnetic field, an electrical coil positioned in said field and adapted to receive an induced voltage, and means for causing a voltage to be induced in said coil in response to the rate of change in pressure within said cylinder, and means for integrating the variations in voltage due to the rate of change of pressure within said cylinder during a given period, said means including a meter having a time constant greater than said period.

2. An apparatus for obtaining a representation of rate of change in pressure within the cylinder of an internal combustion engine comprising means for producing a substantially constant magnetic field, a movable member positioned in said field, an electrical coil carried by said member and positioned in said field and adapted to receive an induced voltage, a diaphragm adapted to be subjected to and oscillated in response to the rate of change in pressure within said cylinder, operative connections between said diaphragm and said movable member whereby said coil is moved in said field to cause a voltage to be induced therein responsive to the rate of change in pressure within said cylinder, and means for integrating the variations in voltage due to the rate of change of pressure within said cylinder during a given period, said means including a meter having a time constant greater than said period.

3. In apparatus for indicating engine detonation by measuring the rate of change of pressure obtaining within an engine cylinder, in combination, a hollow casing arranged to project inwardly through the cylinder head and having an inner thick and substantially rigid diaphragm disposed substantially flush with the inner cylinder wall so as to be directly exposed to the cylinder gases, the rigidity of said diaphragm enabling the same to alone withstand the entire cylinder pressure, and an electromagnetic generator contained within said casing, said generator having a stationary part carried by said casing and having a movable part rigidly supported upon and movable with said diaphragm, the output of said generator corresponding to the rate of change of pressure within said cylinder.

4. In apparatus for indicating engine detonation by measuring the rate of change of pressure obtaining within an engine cylinder, in combination, a hollow casing arranged to project inwardly through the cylinder head and having a stiff though elastic diaphragm at its inner end positioned so as to constitute in effect a continuation of the inner cylinder wall, said diaphragm of itself withstanding the entire cylinder gas pressure exerted directly thereon, and an electric generator contained within said casing, said generator comprising a coil structure fixedly attached to said diaphragm and providing a coil adapted to receive an induced voltage, a core structure carried by said casing and providing a flux field for said coil that is of uniform flux density throughout the range of movement of said coil, motion of said coil in said field producing a voltage in said coil proportional to the velocity thereof, the movement of said coil resulting from diaphragm deflection under pressure changes in the cylinder, the elasticity of the mass consisting of said moving coil structure and diaphragm being confined substantially entirely to said diaphragm.

CHARLES S. DRAPER.